United States Patent
Hua et al.

(10) Patent No.: US 12,443,088 B2
(45) Date of Patent: Oct. 14, 2025

(54) ELECTRONIC PAPER AND DISPLAY DEVICE

(71) Applicants: Beijing BOE Optoelectronics Technology Co., Ltd., Beijing (CN); BOE Technology Group Co., Ltd., Beijing (CN)

(72) Inventors: Gang Hua, Beijing (CN); Min Wang, Beijing (CN); Shaokai Su, Beijing (CN); Dong Wang, Beijing (CN); Zhe Wang, Beijing (CN); Shaobo Li, Beijing (CN); Meng Gong, Beijing (CN); Jintang Hu, Beijing (CN); Jinghao Liu, Beijing (CN); Liangliang Pan, Beijing (CN); Guangquan Wang, Beijing (CN); Liguang Deng, Beijing (CN); Pengkai Fan, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 990 days.

(21) Appl. No.: 17/536,870

(22) Filed: Nov. 29, 2021

(65) Prior Publication Data

US 2022/0252955 A1 Aug. 11, 2022

(30) Foreign Application Priority Data

Feb. 8, 2021 (CN) .......................... 202120365937.4

(51) Int. Cl.
*G02F 1/1676* (2019.01)
*G02F 1/167* (2019.01)

(52) U.S. Cl.
CPC ............ *G02F 1/1676* (2019.01); *G02F 1/167* (2013.01)

(58) Field of Classification Search
CPC ...... G02F 1/167; G02F 1/13; G02F 1/136227; G02F 1/136286
See application file for complete search history.

(56) References Cited

U.S. PATENT DOCUMENTS

2011/0012907 A1* 1/2011 Sakamoto .............. G09G 3/344
345/555

FOREIGN PATENT DOCUMENTS

| CN | 108828871 | * | 11/2018 | ............. G02F 1/167 |
| CN | 108828871 A | * | 11/2018 | ............. G02F 1/167 |
| JP | 4619626 | * | 1/2011 | ............. G02F 1/167 |
| JP | 4619626 B2 | * | 1/2011 | ............. G02F 1/167 |

* cited by examiner

*Primary Examiner* — Brandi N Thomas
(74) *Attorney, Agent, or Firm* — IPro, PLLC (57) ABSTRACT

An electronic paper is provided. An array substrate in the electronic paper includes a base, as well as a pixel electrode, a thin film transistor, and a shielding electrode that are disposed on the base. An orthographic projection of an active layer in the thin film transistor on the base is within an orthographic projection of the shielding electrode on the base and is within an orthographic projection of the pixel electrode on the base.

18 Claims, 6 Drawing Sheets

ELECTRONIC PAPER AND DISPLAY DEVICE

CROSS-REFERENCE TO RELATED APPLICATION

This application claims priority to Chinese Patent Application No. 202120365937.4, filed on Feb. 8, 2021, and entitled "ELECTRONIC PAPER", the disclosure of which is incorporated herein by reference in its entirety.

TECHNICAL FIELD

The present disclosure relates to the field of display technologies, and in particular to electronic paper and a display device.

BACKGROUND

An electronic paper is a novel display, and is mainly applied to devices such as an electronic tag, an advertising board, and an e-book reader. The display effect of the electronic paper is close to the display effect of natural paper, which can reduce visual fatigue during reading.

SUMMARY

Embodiments of the present disclosure provide an electronic paper and a display device. The technical solutions are as follows.

In an aspect of the present disclosure, an electronic paper. The electronic paper includes: an array substrate and a cover plate facing each other, as well as an electrophoretic layer disposed between the array substrate and the cover plate, wherein the array substrate includes: a base; a pixel electrode and a thin film transistor that are disposed on the base, wherein the pixel electrode is connected to the thin film transistor, and the thin film transistor includes an active layer and a source/drain layer lapped with the active layer; and a shielding electrode disposed between the pixel electrode and the source/drain layer, wherein the shielding electrode is insulated from the pixel electrode and the source/drain layer; and an orthographic projection of the active layer on the base is within an orthographic projection of the shielding electrode on the base, and is within an orthographic projection of the pixel electrode on the base.

In some embodiments, the shielding electrode is made of a light-shielding metal material.

In some embodiments, the pixel electrode is made of a single-layered non-metal conductive material.

In some embodiments, the shielding electrode is made of a light-transmitting oxide material.

In some embodiments, the orthographic projection of the shielding electrode on the base and the orthographic projection of the pixel electrode on the base has an overlapped region, and the shielding electrode and the pixel electrode are configured to form a storage capacitor.

In some embodiments, the array substrate further includes: a first insulating layer disposed between the pixel electrode and the shielding electrode, and a second insulating layer disposed between the source/drain layer and the shielding electrode; and the source/drain layer includes a first electrode and a second electrode, wherein the first insulating layer is provided with a first via hole, the second insulating layer is provided with a second via hole communicated with the first via hole, and the pixel electrode is connected to the first electrode through the first via hole and the second via hole.

In some embodiments, the orthographic projection of the shielding electrode on the base and an orthographic projection of the source/drain layer on the base has an overlapped region; the shielding electrode is provided with a third via hole communicated with the first via hole and the second via hole; and the pixel electrode is connected to the first electrode through the first via hole, the third via hole, and the second via hole.

In some embodiments, an orthographic projection of the first via hole on the base and an orthographic projection of the second via hole on the base are both within an orthographic projection of the third via hole on the base.

In some embodiments, the array substrate further includes a thickened insulating layer disposed between the second insulating layer and the source/drain layer.

In some embodiments, the thickened insulating layer is made of a resin material.

In some embodiments, the thin film transistor further includes a gate, wherein the gate is disposed on a side, proximal to the base, of the active layer and is insulated from the active layer; and the array substrate further includes: a gate line connected to the gate, a data line connected to the second electrode, and a common signal line connected to the shielding electrode, wherein an extending direction of the data line intersects an extending direction of the gate line and an extending direction of the common signal line.

In some embodiments, the base is provided with a display region and a non-display region surrounding the display region, and the pixel electrode and the thin film transistor are both disposed in the display region; and the array substrate further includes a plurality of pads disposed in the non-display region, wherein the plurality of pads are connected to at least one of the gate line, the data line, and the common signal line; wherein the plurality of pads and the pixel electrode are disposed in a same layer and made of a same material.

In some embodiments, the array substrate further includes a plurality of signal leads disposed in the non-display region, wherein the plurality of signal leads are connected in one-to-one correspondence with the plurality of pads, and the plurality of signal leads are configured to be connected to at least one of the gate line, the data line, and the common signal line; and the plurality of signal leads and the gate line are disposed in a same layer and made of a same material.

In some embodiments, a plurality of data lines and a plurality of gate lines are provided; two adjacent gate lines and two adjacent data lines are configured to define one pixel region; and two thin film transistors connected in series and one pixel electrode are distributed in one pixel region.

In some embodiments, the two thin film transistors connected in series include a first transistor and a second transistor, wherein a second electrode of the first transistor is connected to the pixel electrode, a first electrode of the first transistor is connected to a second electrode of the second transistor; and the second electrode of the second transistor is connected to the data line, and a gate of the first transistor and a gate of the second transistor are both connected to a same gate line.

In some embodiments, the extending direction of the data line is perpendicular to the extending direction of the gate line and the extending direction of the common signal line.

In some embodiments, the pixel electrode and the thin film transistor are both disposed on a side, proximal to the cover plate, of the base; and the cover plate includes a transparent protective film and a common electrode disposed on a side, facing the array substrate, of the transparent protective film.

In some embodiments, the electrophoretic layer includes a plurality of electrophoretic capsules, wherein the electrophoretic capsule includes a capsule body, and charged particles and an electrophoretic liquid that are disposed in the capsule body.

In some embodiments, the charged particles include at least one type of particles selected from black particles, white particles, and colored particles.

In another aspect of the present disclosure, a display device is provided. The display device includes: a power supply assembly and an electronic paper, wherein the power supply assembly is configured to supply power to the electronic paper; and the electronic paper includes an array substrate and a cover plate facing each other, as well as an electrophoretic layer disposed between the array substrate and the cover plate, wherein the array substrate includes: a base; a pixel electrode and a thin film transistor that are disposed on the base, wherein the pixel electrode is connected to the thin film transistor, and the thin film transistor includes an active layer and a source/drain layer lapped with the active layer; and a shielding electrode disposed between the pixel electrode and the source/drain layer, wherein the shielding electrode is insulated from the pixel electrode and the source/drain layer; and an orthographic projection of the active layer on the base is within an orthographic projection of the shielding electrode on the base, and is within an orthographic projection of the pixel electrode on the base.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
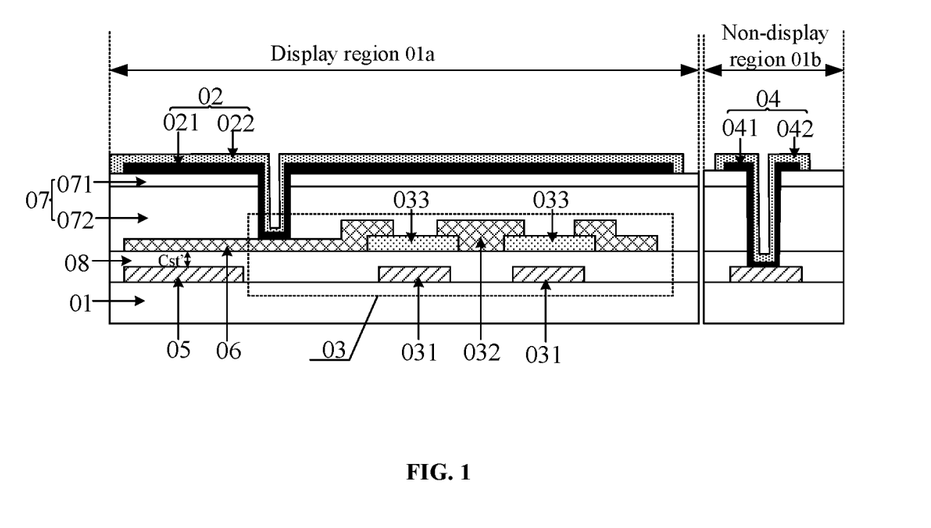
FIG. 1 is a schematic diagram of a film structure of an array substrate in a currently common electronic paper.
Figure 2:
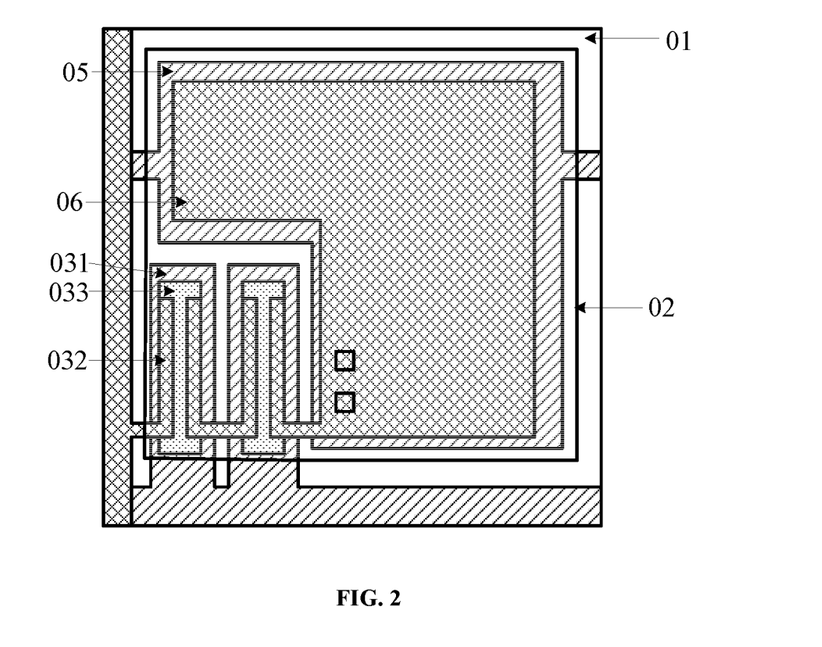
FIG. 2 is a top view of a pixel in the array substrate shown in FIG. 1.

Usually, an electronic paper includes an array substrate and a cover plate facing each other, as well as an electrophoretic layer disposed between the array substrate and the cover plate. Referring to FIG. 1 and FIG. 2, FIG. 1 is a schematic diagram of a film structure of an array substrate in a currently common electronic paper, and FIG. 2 is a top view of a pixel in the array substrate shown in FIG. 1. The array substrate may include a base 01, as well as a pixel electrode 02 and a thin film transistor 03 that are disposed on the base 01. The pixel electrode 02 may be connected to the thin film transistor 03. The electronic paper may control, through the thin film transistor 03, the charging of the pixel electrode 02, and the pixel electrode 02, after being charged, can control the electrophoretic layer, thereby implementing the display function of the electronic paper.

Currently, to improve the display effect of the electronic paper, it needs to be ensured that an orthographic projection of the pixel electrode 02 on the base 01 has a relatively large area. For example, the pixel electrode 02 may directly cover the thin film transistor 03.

However, when the pixel electrode 02 directly covers the thin film transistor 03, the thin film transistor 03 that is in an OFF state may generate a leakage current due to a voltage loaded on the pixel electrode 02 after the pixel electrode 02 is charged. The leakage current affects the performance of the thin film transistor 03, thereby affecting the display effect of the electronic paper.

In addition, during usage of the electronic paper, ambient light is easy to pass through the cover plate and the electrophoretic layer and irradiate the thin film transistor 03. As a result, the thin film transistor 03 generates the leakage current under light irradiation, which further reduces the display effect of the electronic paper.

To prevent ambient light from irradiating the thin film transistor of the array substrate in the electronic paper during usage of the electronic paper, the pixel electrode of the array substrate may be made of a light-shielding metal material. However, in the manufacture process of the electronic paper, the pixel electrode made of the metal material in the array substrate is directly exposed in air. As a result, the pixel electrode is easy to be corroded and scratched. To prevent the pixel electrode made of the metal material from being easily corroded and scratched, the metal electrode in the pixel electrode may be covered by a protective electrode. The protective electrode may be made of a non-metal conductive material, which is hard to be corroded and scratched. For example, the non-metal conductive material may be indium tin oxide (ITO).

In this case, as shown in FIG. 1 and FIG. 2, the pixel electrode 02 may include a metal electrode 021 and a protective electrode 022 that are laminated. The protective electrode 022 needs to completely coat the metal electrode 021, to prevent the metal electrode 021 from being corroded and scratched.

As shown in FIG. 1, the base 01 in the array substrate is provided with a display region 01a and a non-display region 01b surrounding the display region 01a. The pixel electrode 02 and the thin film transistor 03 may be both disposed in the display region 01a. The array substrate may further include a plurality of pads 04 disposed in the non-display region 01b. The array substrate may further include signal lines such as a gate line and a data line. The plurality of pads 04 may be connected to a plurality of signal lines. The plurality of pads 04 may be further connected to a plurality of pins of a driver chip. In this way, the driver chip may control the pixel electrode 02 in the array substrate through the pads 04 and the signal lines, thereby implementing the display function of the electronic paper.

However, the pads 04 in the array substrate are generally formed simultaneously with the pixel electrode 02. When the pixel electrode 02 includes the metal electrode 021 and the protective electrode 022 that are laminated, the pad 04 may include a first sub-pad 041 and a second sub-pad 042 that are laminated. The first sub-pad 041 is made of the same material as the metal electrode 021. The second sub-pad 042 is made of the same material as the protective electrode 022. Because the protective electrode 022 needs to coat the metal electrode 021, the second sub-pad 042 also needs to coat the first sub-pad 041. In this way, the distance between any two adjacent pads 04 in the non-display region 01b may be relatively small.

Figure 3:
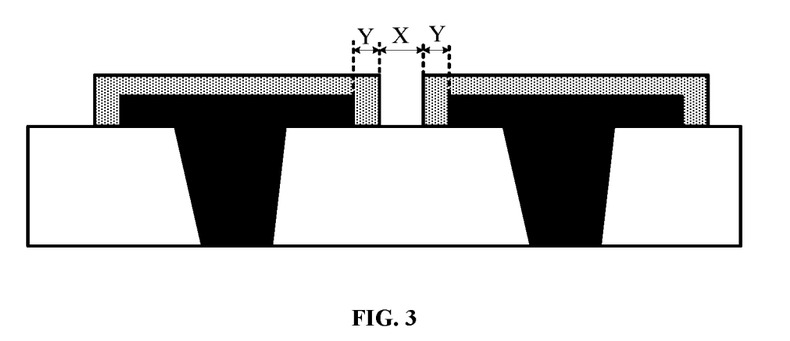
FIG. 3 is a diagram of an arrangement effect of any two adjacent pads in the array substrate shown in FIG. 1.
Figure 4:
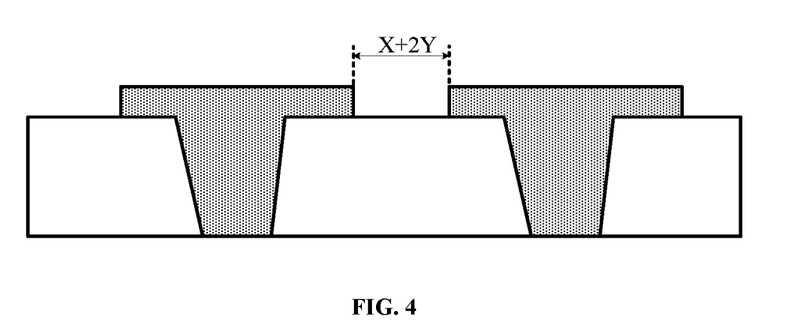
FIG. 4 is a diagram of an arrangement effect of any two adjacent pads in a currently common array substrate in which the pads are made of single-layered electrodes.

For example, as shown in FIG. 3 and FIG. 4, FIG. 3 is a diagram of an arrangement effect of any two adjacent pads in the array substrate shown in FIG. 1, and FIG. 4 is a diagram of an arrangement effect of any two adjacent pads in a currently common array substrate in which the pads are made of single-layered electrodes. It is assumed that, in FIG. 3, the distance between any two adjacent pads 04 is X, and in the direction parallel to the base 01, the width of the part, coating the first sub-pad 041, of the second sub-pad 042 is Y. In the case that the pads in FIG. 3 and FIG. 4 are the manufactured with the same precision, the distance between any two adjacent pads in FIG. 4 is X+2Y. Therefore, the distance between any two adjacent pads 04 in the array substrate shown in FIG. 1 is relatively small. When the plurality of pads 04 in the array substrate are connected to the plurality of pins in the driver chip, if the distance between any two adjacent pads 04 is relatively small, it is highly possible that connections between the plurality of pads 04 and the plurality of pins are misaligned, which results in display failure of the electronic paper provided with the array substrate.

Figure 5:
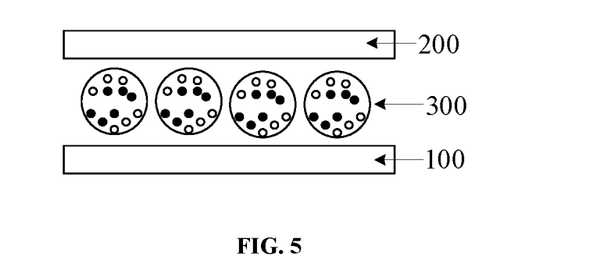
FIG. 5 is a schematic diagram of a film structure of an electronic paper according to an embodiment of the present disclosure.

Referring to FIG. 5, FIG. 5 is a schematic diagram of a film structure of electronic paper according to an embodiment of the present disclosure. The electronic paper may include an array substrate 100 and a cover plate 200 facing each other, as well as an electrophoretic layer 300 disposed between the array substrate 100 and the cover plate 200.

Figure 6:
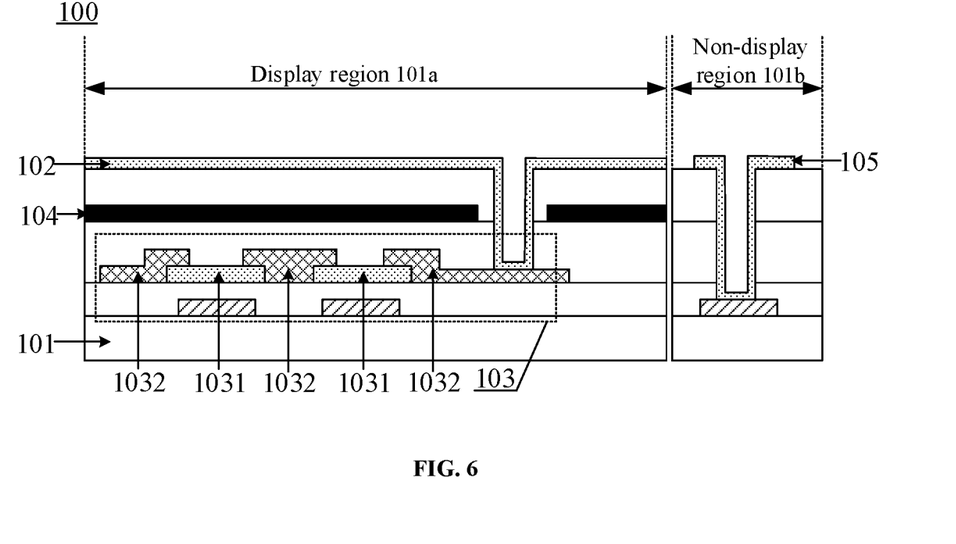
FIG. 6 is a schematic diagram of a film structure of an array substrate in the electronic paper shown in FIG. 5.

Referring to FIG. 6, FIG. 6 is a schematic diagram of a film structure of an array substrate in the electronic paper shown in FIG. 5. The array substrate 100 may include a base 101, as well as a pixel electrode 102, a thin film transistor 103, and a shielding electrode 104 that are disposed on the base 101.

The thin film transistor 103 may include an active layer 1031 and a source/drain layer 1032 lapped with the active layer 1031. The source/drain layer 1032 may be connected to the pixel electrode 102. It should be noted that, the source/drain layer 1032 may include a first electrode and a second electrode. The first electrode and the second electrode may be both lapped with the active layer 1031. The first electrode may be one of a source and a drain, and the second electrode may be the other one of the source and the drain. The pixel electrode 102 may be connected to the first electrode, thereby connecting the pixel electrode 102 and the thin film transistor 103.

The shielding electrode 104 may be disposed between the pixel electrode 102 and the source/drain layer 1032 in the thin film transistor 103. The shielding electrode 104 may be insulated from the pixel electrode 102 and the source/drain layer 1032 in the thin film transistor 103. An orthographic projection of the active layer 1031 in the thin film transistor 103 on the base 101 is within an orthographic projection of the shielding electrode 104 on the base 101 and is within an orthographic projection of the pixel electrode 102 on the base 101. In other words, the shielding electrode 104 may cover the thin film transistor 103, and the pixel electrode 102 may also cover the thin film transistor 103. When the pixel electrode 102 covers the thin film transistor 103, it can be ensured that the area of the orthographic projection of the pixel electrode 102 on the base 101 is relatively large, thereby improving the display effect of the electronic paper.

In this embodiment of the present disclosure, a constant common voltage may be applied to the shielding electrode 104 disposed between the pixel electrode 102 and the source/drain layer 1032 in the thin film transistor 103. For example, the common voltage may be 0 volt. Therefore, the constant common voltage applied to the shielding electrode 104 does not cause the thin film transistor 103 that is in an OFF state to generate a leakage current. In addition, the constant common voltage applied to the shielding electrode 104 may screen a voltage applied to the pixel electrode 102. Therefore, the voltage applied to the pixel electrode 102 does not cause the thin film transistor 103 that is in the OFF state to generate a leakage current. In this way, the shielding electrode 104 may prevent the voltage applied to the pixel electrode 102 from affecting the performance of the thin film transistor 103, thereby further improving the display effect of the electronic paper.

In summary, the electronic paper provided in this embodiment of the present disclosure includes an array substrate and a cover plate facing each other, as well as an electrophoretic layer disposed between the array substrate and the cover plate. The array substrate may include a base, as well as a pixel electrode, a thin film transistor, and a shielding electrode that are disposed on the base. The orthographic projection of the active layer in the thin film transistor on the base is within the orthographic projection of the shielding electrode on the base and within the orthographic projection of the pixel electrode on the base. In this way, it can be ensured that the area of the orthographic projection of the pixel electrode on the base is relatively large, thereby improving the display effect of the electronic paper. In addition, the constant common voltage applied to the shielding electrode does not cause the thin film transistor that is in an OFF state to generate a leakage current. The constant common voltage applied to the shielding electrode may screen the voltage applied to the pixel electrode. Therefore, the voltage applied to the pixel electrode does not cause the thin film transistor that is in the OFF state to generate a leakage current. In this way, the shielding electrode may prevent the voltage applied to the pixel electrode from affecting the performance of the thin film transistor, thereby further improving the display effect of the electronic paper.

Furthermore, in an array substrate in a currently common electronic paper, as shown in FIG. 1, to lower the probability that the thin film transistor 03 that is in the OFF state generates a leakage current due to the voltage applied to the pixel electrode 02, it needs to be ensured that an insulating layer 07 between the pixel electrode 02 and the thin film transistor 03 has relatively thick. For example, the insulating layer 07 may include a thin passivation layer 071 and a thick resin layer 072 that are laminated. Therefore, the manufacture cost of the array substrate is relatively high.

However, in this embodiment of the present disclosure, the shielding electrode 104 in the array substrate 100 is disposed between the pixel electrode 102 and the source/drain layer 1032 in the thin film transistor 103, and the shielding electrode 104 can prevent the voltage applied to the pixel electrode 102 from causing the thin film transistor 103 that is in the OFF state to generate a leakage current. Therefore, the thick resin layer does not need to be disposed between the shielding electrode 104 and the source/drain layer 1032 in the thin film transistor 103, and only the thin passivation layer needs to be disposed, which effectively reduces the manufacture cost of the array substrate 100.

In this embodiment of the present disclosure, as shown in FIG. 6, the shielding electrode 104 may be made of a light-shielding metal material or a light-transmitting oxide material. When the shielding electrode 104 is made of the light-shielding metal material, the shielding electrode 104 may be a light-shielding electrode. The light-shielding metal material may include metal materials such as metal aluminum, metal molybdenum, or an alloy. When the shielding electrode 104 is made of the light-transmitting oxide material, the shielding electrode 104 is a light-transmitting electrode. The light-transmitting oxide material may include a transparent conductive material such as ITO. The following embodiments are illustrated by taking an example in which the shielding electrode 104 is a light-shielding electrode.

When the shielding electrode 104 is a light-shielding electrode, because the orthographic projection of the active layer 1031 in the thin film transistor 103 on the base 101 is within the orthographic projection of the shielding electrode 104 on the base 101, the shielding electrode 104 can shield ambient light passing through the cover plate 200 and the electrophoretic layer 300 in the electronic paper, to prevent the ambient light from directly irradiating the active layer 1031 in the thin film transistor 103, thereby preventing the active layer 1031 from generating a leakage current due to ambient light irradiation. Thus, the display effect of the electronic paper is effectively improved.

Furthermore, the shielding electrode 104 in the array substrate 100 is insulated from the pixel electrode 102. Therefore, the shielding electrode 104 may be coated by the insulating layer disposed between the shielding electrode 104 and the pixel electrode 102, which prevents the shielding electrode 104 from being corroded or scratched in the manufacture process of the electronic paper.

In addition, the pixel electrode 102 does not need to be an electrode having a light-shielding property. Therefore, the pixel electrode 102 may be made of a single-layered non-metal conductive material. For example, the non-metal conductive material may include a transparent conductive material such as ITO. In this case, in the manufacture process of the electronic paper, the pixel electrode 102 is hard to be corroded and scratched. As shown in FIG. 6, the base 101 in the array substrate 100 is provided with a display region 101a and a non-display region 101b disposed surrounding the display region 101a. The pixel electrode 102 and the thin film transistor 103 in the array substrate 100 may be both disposed in the display region 101a. The array substrate 100 may further include a plurality of pads 105 disposed in the non-display region. The plurality of pads 105 may be disposed in the same layer and made of the same material as the pixel electrode 102 in the array substrate 100. In other words, the plurality of pads 105 and the pixel electrode 102 may be formed by the same patterning process. Because the material of the pixel electrode 102 may only include the transparent conductive material such as ITO, the material of the plurality of pads 105 may also only include the transparent conductive material. Therefore, in the manufacture process of the array substrate 100, the plurality of pads 105 formed simultaneously with the pixel electrode 102 are made of single-layered electrodes, which can ensure that the distance between any two adjacent pads 105 is relatively large. When the plurality of pads 105 in the array substrate 100 are connected to a plurality of pins in a driver chip, the probability that connections between the plurality of pads 105 and the plurality of pins are misaligned can be effectively lowered, thereby ensuring the normal display of the electronic paper.

Figure 7:
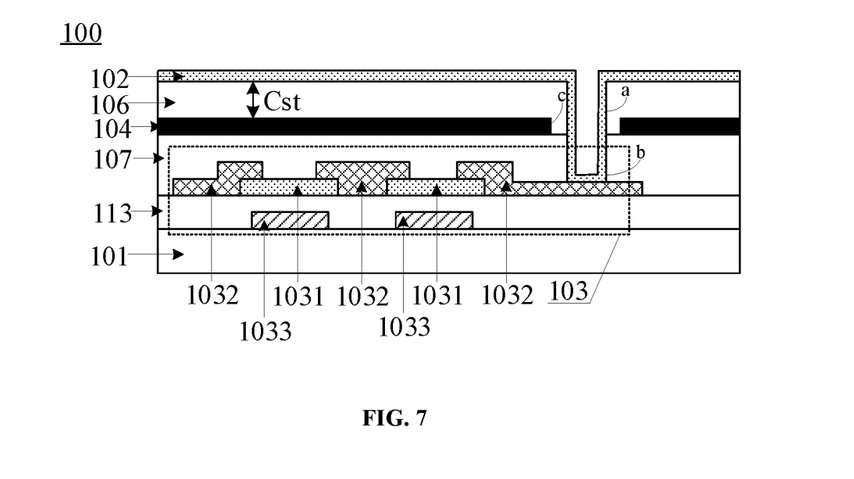
FIG. 7 is a schematic diagram of a film structure of an array substrate according to an embodiment of the present disclosure.
Figure 8:
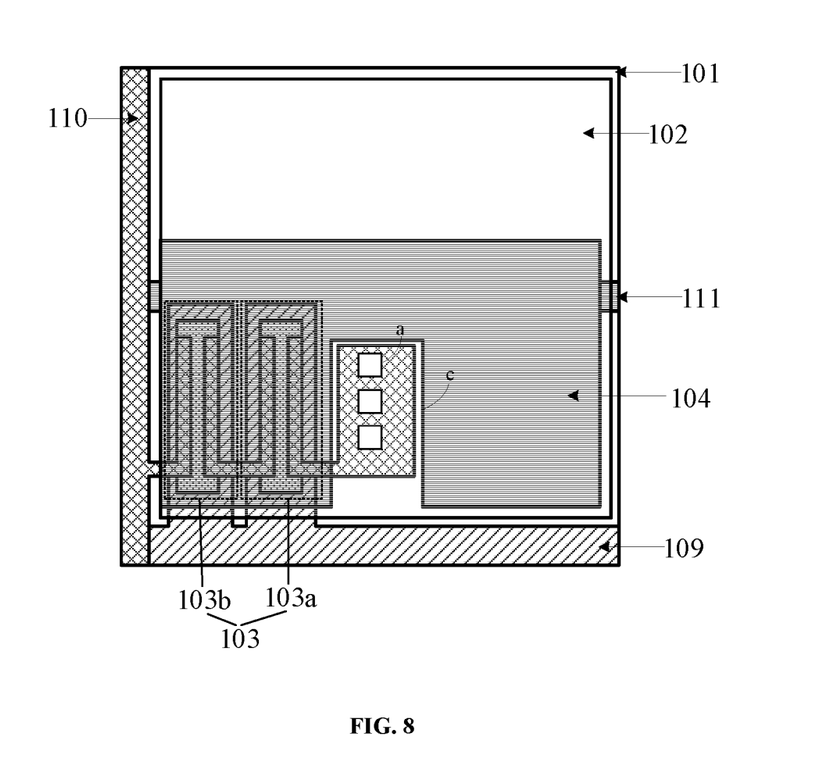
FIG. 8 is a top view of a pixel in the array substrate shown in FIG. 7.

In an embodiment of the present disclosure, as shown in FIG. 7 and FIG. 8, FIG. 7 is a schematic diagram of a film structure of an array substrate according to an embodiment of the present disclosure, and FIG. 8 is a top view of a pixel in the array substrate shown in FIG. 7. The orthographic projection of the shielding electrode 104 on the base 101 and the orthographic projection of the pixel electrode 102 on the base 101 has an overlapped region. Because the shielding electrode 104 is insulated from the pixel electrode 102, when the electronic paper displays, a storage capacitor Cst may be formed between the shielding electrode 104 and the pixel electrode 102 whose orthographic projections on the base 101 have an overlapped region. The storage capacitor Cst can keep the stability of the voltage applied to the pixel electrode 102.

For example, as shown in FIG. 7, the array substrate 100 may further include a first insulating layer 106 disposed between the pixel electrode 102 and the shielding electrode 104, and a second insulating layer 107 disposed between the source/drain layer 1032 in the thin film transistor 103 and the shielding electrode 104. It should be noted that, the first insulating layer 106 and the second insulating layer 107 may be both passivation layers and the material of the passivation layers may include an inorganic insulation material. Generally, the passivation layers may be relatively thin. The pixel electrode 102 may be insulated from the shielding electrode 104 by means of the first insulating layer 106. The source/drain layer 1032 may be insulated from the shielding electrode 104 by means of the second insulating layer 107. The first insulating layer 106 is provided with a first via hole a. The second insulating layer 107 is provided with a second via hole b communicated with the first via hole a. The pixel electrode 102 may be connected to the first electrode of the thin film transistor 103 through the first via hole a and the second via hole b. It should be noted that, the pixel electrode 102 and the shielding electrode 104 disposed on two sides of the first insulating layer 106 and the first insulating layer 106 can form the storage capacitor Cst.

In an array substrate in a currently common electronic paper, as shown in FIG. 1 and FIG. 2, the array substrate may further include a first auxiliary electrode 05 and a second auxiliary electrode 06 that are insulated from each other. An orthographic projection of the first auxiliary electrode 05 on the base 01 and an orthographic projection of the second auxiliary electrode 06 on the base 01 has an overlapped region. Therefore, the first auxiliary electrode 05 and the second auxiliary electrode 06 may form a storage capacitor Cst'. The first auxiliary electrode 05 is disposed in the same metal layer as the gate 031 of the thin film transistor 03. The second auxiliary electrode 06 is disposed in the same metal layer as the source/drain layer 032 in the thin film transistor 03. Because the storage capacitor Cst' with a relatively large capacitance is required during display of the electronic paper, the overlapped region between the first auxiliary electrode 05 and the second auxiliary electrode 06 needs to be enlarged. As a result, the metal layer in which the first auxiliary electrode 05 is disposed has a relatively large area, and the metal layer in which the second auxiliary electrode 06 is disposed also has a relatively large area. However, in the manufacture process of the array substrate, a dry etching process is usually adopted to manufacture the metal layer in the array substrate. When the metal layer is manufactured by the dry etching process, the metal layer has a high capability of absorbing electrons. As a result, the array substrate generates static electricity easily. After the array substrate generates the static electricity, the static electricity destroys the film structure in the array substrate, which causes a relatively low yield of the array substrate.

However, in the embodiment of the present disclosure, the storage capacitor Cst is formed between the shielding electrode 104 made of a metal material and the pixel electrode 102. The pixel electrode 102 is made of a non-metal material, and the pixel electrode 102 may be manufactured by a wet etching process; and in the manufacture process of the pixel electrode 102, the pixel electrode 102 is hard to absorb electrons. Therefore, it only needs to be ensured in the array substrate 100 that the metal layer in which the shielding electrode 104 is disposed has a relatively large area. Compared with the solution of the array substrate shown in FIG. 1 in which the two metal layers need to have a relatively large area, the metal layer in the array substrate 100 provided in this embodiment of the present disclosure has a relatively small area, which effectively lowers the metal layer's capability of absorbing electrons in the manufacture process of the array substrate 100, thereby lowering the probability that static electricity generated in the manufacture process destroys the film structure in the array substrate. Therefore, the yield of the array substrate 100 is relatively high. It should be noted that, without considering the influence of ambient light on the display effect of the electronic paper, the shielding electrode 104 may be a light-transmitting electrode. In this case, the shielding electrode 104 is not made of a metal material either and may also be manufactured by the wet etching process, which further reduces the area of the metal layer in the array substrate 100, thereby lowering the probability that static electricity generated in the manufacture process destroys the film structure of the array substrate.

In some embodiments, as shown in FIG. 7 and FIG. 8, the orthographic projection of the shielding electrode 104 in the array substrate 100 on the base 101 and the orthographic projection of the source/drain layer 1032 in the thin film transistor 103 on the base 101 may have an overlapped region. In this case, the shielding electrode 104 is provided with a third via hole c communicated with the first via hole a and the second via hole b. The pixel electrode 102 may be connected to the first electrode of the thin film transistor 103 through the first via hole a, the third via hole c, and the second via hole b.

In this embodiment of the present disclosure, the orthographic projection of the first via hole a on the base 101 and the orthographic projection of the second via hole b on the base 101 are both within the orthographic projection of the third via hole c on the base 101. In this way, the first insulating layer 106 may completely coat the shielding electrode 104. After the pixel electrode 102 is connected to the first electrode of the thin film transistor 103, the pixel electrode 102 is not connected to the shielding electrode 104, thereby avoiding short circuit between the pixel electrode 102 and the shielding electrode 104.

Figure 9:
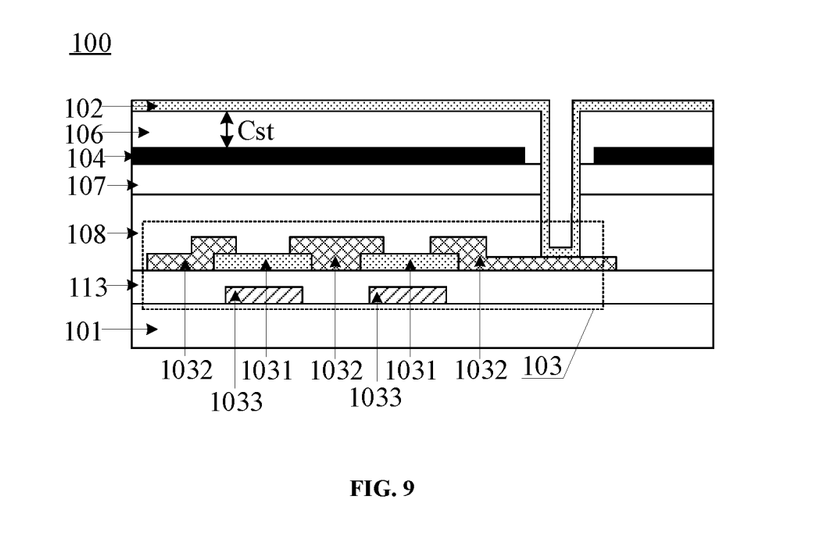
FIG. 9 is a schematic diagram of a film structure of another array substrate according to an embodiment of the present disclosure.

In some embodiments, as shown in FIG. 9, FIG. 9 is a schematic diagram of a film structure of another array substrate according to an embodiment of the present disclosure. Without considering the manufacture cost of the array substrate, the array substrate 100 may further include a thickened insulating layer 108 disposed between the source/drain layer 1032 in the thin film transistor 103 and the second insulating layer 107. For example, the material of the thickened insulating layer 108 may include a resin material. In other words, the thickened insulating layer 108 may be a relatively thick resin layer. In the present disclosure, the distance between the source/drain layer 1032 in the thin film transistor 103 and the shielding electrode 104 can be increased by means of the thickened insulating layer 108, thereby reducing the value of the coupling capacitance generated between the shielding electrode 104 and the source/drain layer 1032, which can improve the display effect of the electronic paper provided with the array substrate 100.

In this embodiment of the present disclosure, as shown in FIG. 7, the thin film transistor 103 in the array substrate 100 may further include a gate 1033. The gate 1033 may be disposed on the side, proximal to the base 101, of the active layer 1031, and may be insulated from the active layer 1032. For example, the array substrate 100 may further include a gate insulating layer 113 disposed between the gate 1033 and the active layer 1032. In this case, the thin film transistor 103 in the array substrate 100 may be a bottom-gate thin film transistor. It should be noted that, in other optional implementations, the thin film transistor 103 may also be a top-gate thin film transistor, which is not limited in the embodiments of the present disclosure.

As shown in FIG. 8, the array substrate 100 may further include: a gate line 109 connected to the gate 1033 of the thin film transistor 103, a data line 110 connected to the second electrode of the thin film transistor 103, and a common signal line 111 connected to the shielding electrode 104. An extending direction of the data line 110 may intersect an extending direction of the gate line 109 and an extending direction of the common signal line 111. For example, the extending direction of the data line 110 may be perpendicular to the extending direction of the gate line 109 and the extending direction of the common signal line 111.

In the present disclosure, the gate line 109 in the array substrate 100 may be disposed in the same layer and made of the same material as the gate 1033 of the thin film transistor 103. That is, the gate line 109 and the gate 1033 may be formed simultaneously by one patterning process. The data line 110 in the array substrate 100 may be disposed in the same layer and made of the same material as the source/drain layer 1032 in the thin film transistor 103. That is, the data line 110 and the source/drain layer 1032 may be formed by one patterning process. The common signal line 111 in the array substrate 100 may be disposed in the same layer and made of the same material as the shielding electrode 104. That is, the common signal line 111 and the shielding electrode 104 may the formed by one patterning process. In this way, the manufacture process of the array substrate 100 is effectively simplified, and the manufacture cost of the array substrate 100 is effectively reduced.

Figure 10:
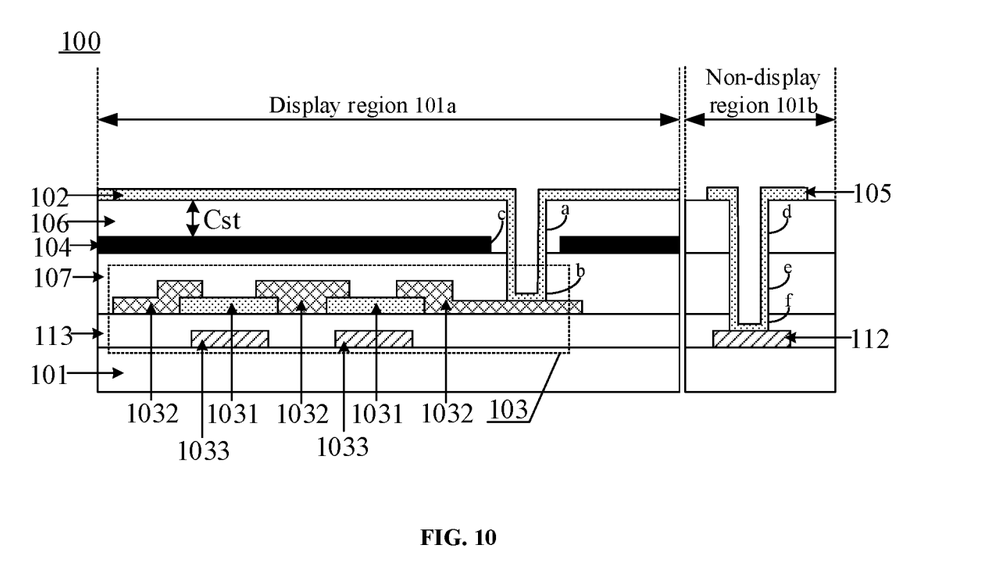
FIG. 10 is a schematic diagram of a film structure of still another array substrate according to an embodiment of the present disclosure.

In this embodiment of the present disclosure, the plurality of pads 105 in the array substrate 100 may be connected to at least one of the gate line 109, the data line 110, and the common signal line 111. For example, as shown in FIG. 10, which is a schematic diagram of a film structure of still another array substrate according to an embodiment of the present disclosure, the array substrate 110 may further include a plurality of signal leads 112 disposed in the non-display region 101b. The plurality of signal leads 112 may be connected in one-to-one correspondence with the plurality of pads 105. Each signal lead 112 may be connected to one pad 105 and one signal line (which may be the gate line 109, the data line 110, or the common signal line 111). In the present disclosure, the signal lead 112 may be disposed in the same layer and made of the same material as the gate line 109. That is, the signal lead 112 and the gate line 109 may be formed by one patterning process. In this way, the manufacture process of the array substrate 100 is further simplified, and the manufacture cost of the array substrate 100 is further reduced. In this case, the first insulating layer 106 disposed in the non-display region 101b is provided with a fourth via hole d; the second insulating layer 107 disposed in the non-display region 101b is further provided with a fifth via hole e communicated with the fourth via hole d; and the gate insulating layer 113 disposed in the non-display region 101b is provided with a sixth via hole f communicated with the fifth via hole e. The pad 105 may be connected to the signal lead 112 through the fourth via hole d, the fifth via hole e, and the sixth via hole f.

It should be noted that, the plurality of pads 105 in the array substrate 100 may be connected to a plurality of weld legs in a driver chip. The driver chip can perform at least one of the following signal loading through the plurality of pads 105: loading a scanning signal to the gate line 109, loading a data signal to the data line 110, or loading a common voltage signal to the common signal line 111.

In this embodiment of the present disclosure, as shown in FIG. 8, the array substrate 100 is provided with a plurality of pixel regions (not shown in the figure) arranged in an array. For example, a plurality of data lines 110 and a plurality of gate lines 109 are provided in the array substrate 100, and two adjacent data lines 110 and two adjacent gate lines 109 can define one pixel region.

Two thin film transistors 103 that are connected in series and one pixel electrode 102 may be distributed in each pixel region. For example, the two thin film transistors 103 that are connected in series in each pixel region are a first transistor 103a and a second transistor 103b respectively. The second electrode of the first transistor 103a is connected to the pixel electrode 102, and the first electrode of the first transistor 103a is connected to the second electrode of the second transistor 103b. The second electrode of the second transistor 103b is connected to the data line 110, and the gate of the first transistor 103a and the gate of the second transistor 103b are both connected to the same gate line 109. The influence of the leakage current in the thin film transistor 103 on the pixel voltage applied to the pixel electrode 102 can be reduced by means of the two thin film transistors 103 connected in series, thereby improving the display effect of the electronic paper in which the array substrate 100 is disposed.

In combination with the foregoing embodiments, the manufacture method of the array substrate 100 provided in the embodiments of the present disclosure and the manufacture method of a currently common array substrate are compared in the following embodiments.

Figure 11:
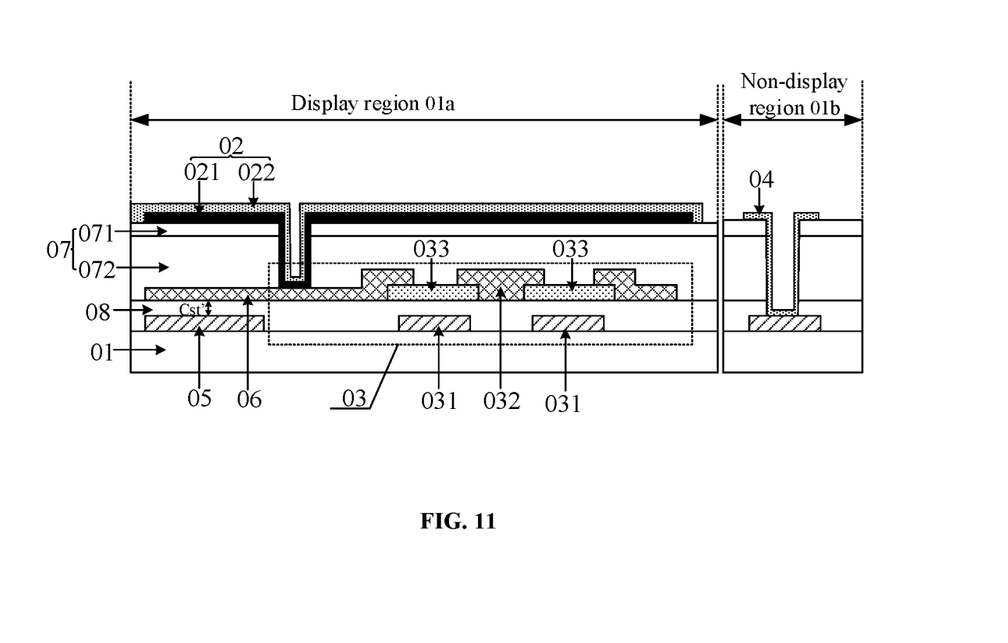
FIG. 11 is a schematic diagram of a film structure of another currently common array substrate.

Currently, to increase the distance between any two adjacent pads 04 in the array substrate shown in FIG. 1, it needs to be ensured that the pad 04 includes only one layer of electrodes. Therefore, as shown in FIG. 11, which is a schematic diagram of a film structure of another currently common array substrate, a metal part of the pad 04 may be removed through process optimization. In this case, the manufacture method of the array substrate includes the following steps.

First, a first metal layer is formed on the base 01 by one patterning process. The first metal layer may include the gate 031 of the thin film transistor 03, the first auxiliary electrode 05, and the like.

Next, a gate insulating layer 08 is formed on the first metal layer, and an active layer pattern and a second metal layer are formed on the gate insulating layer 08 by one patterning process. The active layer pattern includes the active layer 033 in the thin film transistor 03. The second metal layer may include the source/drain layer 032 in the thin film transistor 03, the second auxiliary electrode 06, and the like.

Then, an insulating layer 07 is formed on the second metal layer, and a via hole for connecting the pixel electrode and the source/drain layer is formed in only the part, in the display region, of the insulating layer 07 by one patterning process.

Then, a third metal layer is formed on the insulating layer 07 by one patterning process. The third metal layer includes a metal electrode 021, and the third metal layer is not provided in the non-display region of the array substrate.

Then, a via hole for connecting a pad and a lead is formed in only the part, in the non-display region, of the insulating layer 07 by one patterning process.

Finally, a protective electrode layer is formed on the third metal layer by one patterning process. The protective electrode layer may include a protective electrode 022 and a pad 04.

In this way, at least six patterning processes are required for manufacturing the array substrate shown in FIG. 11.

However, in the embodiment of the present disclosure, to manufacture the array substrate shown in FIG. 10, the manufacture method of the array substrate includes the following steps.

First, a first metal layer is formed on the base 101 by one patterning process. The first metal layer may include the gate 1033 of the thin film transistor 103, the gate line 109, and the signal lead 112.

Next, a gate insulating layer 113 is formed on the first metal layer, and an active layer pattern and a second metal layer are formed on the gate insulating layer 113 by one patterning process. The active layer pattern includes the active layer 1031 in the thin film transistor 103. The second metal layer may include the source/drain layer 1032 in the thin film transistor 103 and the data line 110.

Then, a second insulating layer 107 is formed on the second metal layer, and a third metal layer is formed on the second insulating layer 107 by one patterning process. The third metal layer includes the shielding electrode and the common signal line 111.

Then, a first insulating layer 106 is formed on the third metal layer; and a first via hole a and the second via hole b communicated with the first via hole a are respectively formed in the first insulating layer 106 and the second insulating layer 107 by one patterning process.

Finally, a pixel electrode layer is formed on the third metal layer by one patterning process. The pixel electrode layer may include a pixel electrode 102 and a pad 105.

In this way, only five patterning processes are required for manufacturing the array substrate shown in FIG. 10, which can further simplify the manufacture process of the array substrate 100 and further reduce the manufacture cost of the array substrate 100. It should be noted that, the one patterning process in the foregoing embodiments may include photoresist coating, exposure, development, etching, and photoresist stripping.

Figure 12:
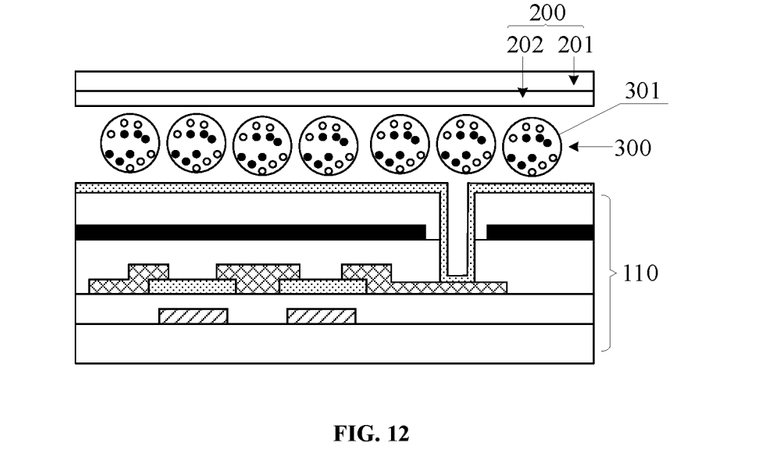
FIG. 12 is a schematic diagram of a film structure of another electronic paper according to an embodiment of the present disclosure.

In some embodiments, referring to FIG. 12, which is a schematic diagram of a film structure of another electronic paper according to an embodiment of the present disclosure, the electrophoretic layer 300 in the electronic paper may include a plurality of electrophoretic capsules 301. Each electrophoretic capsule 301 may include a capsule body, as well as charged particles and an electrophoretic liquid that are disposed in the capsule body. The charged particles may include at least one type of particles selected from black particles, white particles, colored particles, and the like.

In the present disclosure, the cover plate 200 in the electronic paper may include a transparent protective film 201 and a common electrode 202 disposed on the transparent protective film 201. In some embodiments, the material of the transparent protective film 201 may include polyethylene terephthalate with high transmittance. The common electrode 202 may be a planar electrode, and the material of the common electrode 202 may include ITO. When a voltage is applied to the pixel electrode 102 in the array substrate 100, a voltage difference is generated between the pixel electrode 102 and the common electrode 202. Under the action of the voltage difference, the charged particles in each electrophoretic capsule 301 move in the electrophoretic liquid, thereby implementing display of the electronic paper.

In summary, the electronic paper provided in this embodiment of the present disclosure includes an array substrate and a cover plate facing each other, as well as an electrophoretic layer disposed between the array substrate and the cover plate. The array substrate may include a base, as well as a pixel electrode, a thin film transistor, and a shielding electrode that are disposed on the base. The orthographic projection of an active layer in the thin film transistor on the base is within the orthographic projection of the shielding electrode on the base and within the orthographic projection of the pixel electrode on the base. In this way, it can be ensured that the orthographic projection of the pixel electrode on the base has a relatively large area, thereby improving the display effect of the electronic paper. In addition, the constant common voltage applied to the shielding electrode does not cause the thin film transistor that is in an OFF state to generate a leakage current, and the constant common voltage applied to the shielding electrode may screen the voltage applied to the pixel electrode. Therefore, the voltage applied to the pixel electrode does not cause the thin film transistor that is in the OFF state to generate a leakage current. In this way, the shielding electrode may prevent the voltage applied to the pixel electrode from affecting the performance of the thin film transistor, thereby further improving the display effect of the electronic paper.

Further, when the shielding electrode is a light-shielding electrode, the shielding electrode can shield ambient light passing through the cover plate and the electrophoretic layer in the electronic paper, which prevents the active layer from generating a leakage current due to ambient light irradiation, thereby effectively improving the display effect of the electronic paper. Furthermore, the shielding electrode may be coated by the first insulating layer disposed between the shielding electrode and the pixel electrode, which prevents the shielding electrode from being corroded or scratched in the manufacture process of the electronic paper. In this way, in the manufacture process of the array substrate, the plurality of pads formed simultaneously with the pixel electrode are made of single-layered electrodes, which can ensure that the distance between any two adjacent pads is relatively big. When the plurality of pads in the array substrate are connected to a plurality of pins in a driver chip, the probability that connections between the plurality of pads and the plurality of pins are misaligned can be effectively lowered, thereby ensuring the normal display of the electronic paper.

An embodiment of the present disclosure further provides a display device. The display device may be an electronic tag, an advertising board, an e-book reader, or the like. The display device may include the electronic paper in the foregoing embodiments and a power supply assembly. The power supply assembly is configured to supply power to the electronic paper.

It should be noted that, in the accompanying drawings, dimensions of layers and regions may be scaled up for graphical clarity. In addition, it is to be understood that, when an element or layer is described as being "on" another element or layer, it may be directly on the another element or layer, or there may be an element or layer between them. In addition, it is to be understood that, when an element or layer is described as being "under" another element or layer, it may be directly under the another element or layer, or there may be more than one element or layer between them. In addition, it can also be understood that, when a layer or element is described as being "between" two layers or elements, it may be the only layer or element between the two layers or elements, or there may also be more than one intermediate layer or element. In the entire disclosure, similar reference numerals indicate similar elements.

In the present disclosure, the terms "first" and "second" are used merely for descriptive purposes and cannot be construed as indicating or implying of any relative importance. Unless otherwise specified, the term "a plurality of" means two or more.

Described above are merely optional embodiments of the present disclosure, but are not intended to limit the present disclosure. Any modifications, equivalent substitutions, improvements and the like made within the spirit and principles of the present disclosure should be included within the scope of protection of the present disclosure.

What is claimed is:

1. An electronic paper, comprising: an array substrate and a cover plate facing each other, as well as an electrophoretic layer disposed between the array substrate and the cover plate, wherein the array substrate comprises:
   a base;
   a pixel electrode and a thin film transistor that are disposed on the base, wherein the pixel electrode is connected to the thin film transistor, and the thin film transistor comprises an active layer and a source/drain layer lapped with the active layer; and
   a shielding electrode disposed between the pixel electrode and the source/drain layer, wherein the shielding electrode is insulated from the pixel electrode and the source/drain layer; and an orthographic projection of the active layer on the base is within an orthographic projection of the shielding electrode on the base, and is within an orthographic projection of the pixel electrode on the base,
   wherein the orthographic projection of the shielding electrode on the base and the orthographic projection of the pixel electrode on the base has an overlapped region, and the shielding electrode and the pixel electrode are configured to form a storage capacitor,
   the array substrate further comprises: a first insulating layer disposed between the pixel electrode and the shielding electrode, and a second insulating layer disposed between the source/drain layer and the shielding electrode; and
   the source/drain layer comprises a first electrode and a second electrode,
   wherein the first insulating layer is provided with a first via hole, the second insulating layer is provided with a second via hole communicated with the first via hole, and the pixel electrode is connected to the first electrode through the first via hole and the second via hole.

2. The electronic paper according to claim 1, wherein the shielding electrode is made of a light-shielding metal material.

3. The electronic paper according to claim 2, wherein the pixel electrode is made of a single-layered non-metal conductive material.

4. The electronic paper according to claim 1, wherein the shielding electrode is made of a light-transmitting oxide material.

5. The electronic paper according to claim 1, wherein the orthographic projection of the shielding electrode on the base and an orthographic projection of the source/drain layer on the base has an overlapped region; the shielding electrode is provided with a third via hole communicated with the first via hole and the second via hole; and the pixel electrode is connected to the first electrode through the first via hole, the third via hole, and the second via hole.

6. The electronic paper according to claim 5, wherein an orthographic projection of the first via hole on the base and an orthographic projection of the second via hole on the base are both within an orthographic projection of the third via hole on the base.

7. The electronic paper according to claim 1, wherein the array substrate further comprises a thickened insulating layer disposed between the second insulating layer and the source/drain layer.

8. The electronic paper according to claim 7, wherein the thickened insulating layer is made of a resin material.

9. The electronic paper according to claim 1, wherein the thin film transistor further comprises a gate, wherein the gate is disposed on a side, proximal to the base, of the active layer and is insulated from the active layer; and
the array substrate further comprises: a gate line connected to the gate, a data line connected to the second electrode, and a common signal line connected to the shielding electrode,
wherein an extending direction of the data line intersects an extending direction of the gate line and an extending direction of the common signal line.

10. The electronic paper according to claim 9, wherein the base is provided with a display region and a non-display region surrounding the display region, and the pixel electrode and the thin film transistor are both disposed in the display region; and
the array substrate further comprises a plurality of pads disposed in the non-display region, wherein the plurality of pads are connected to at least one of the gate line, the data line, and the common signal line;
wherein the plurality of pads and the pixel electrode are disposed in a same layer and made of a same material.

11. The electronic paper according to claim 10, wherein the array substrate further comprises a plurality of signal leads disposed in the non-display region, wherein
the plurality of signal leads are connected in one-to-one correspondence with the plurality of pads, and the plurality of signal leads are configured to be connected to at least one of the gate line, the data line, and the common signal line; and
the plurality of signal leads and the gate line are disposed in a same layer and made of a same material.

12. The electronic paper according to claim 9, wherein a plurality of data lines and a plurality of gate lines are provided; two adjacent gate lines and two adjacent data lines are configured to define one pixel region; and two thin film transistors connected in series and one pixel electrode are distributed in one pixel region.

13. The electronic paper according to claim 12, wherein the two thin film transistors connected in series comprise a first transistor and a second transistor, wherein
a second electrode of the first transistor is connected to the pixel electrode, a first electrode of the first transistor is connected to a second electrode of the second transistor; and
the second electrode of the second transistor is connected to the data line, and a gate of the first transistor and a gate of the second transistor are both connected to a same gate line.

14. The electronic paper according to claim 9, wherein the extending direction of the data line is perpendicular to the extending direction of the gate line and the extending direction of the common signal line.

15. The electronic paper according to claim 1, wherein the pixel electrode and the thin film transistor are both disposed on a side, proximal to the cover plate, of the base; and the cover plate comprises a transparent protective film and a common electrode disposed on a side, facing the array substrate, of the transparent protective film.

16. The electronic paper according to claim 1, wherein the electrophoretic layer comprises a plurality of electrophoretic capsules, wherein the electrophoretic capsule comprises a capsule body, and charged particles and an electrophoretic liquid that are disposed in the capsule body.

17. The electronic paper according to claim 16, wherein the charged particles comprise at least one type of particles selected from black particles, white particles, and colored particles.

18. A display device, comprising: a power supply assembly and an electronic paper, wherein the power supply assembly is configured to supply power to the electronic paper; and
the electronic paper comprises an array substrate and a cover plate facing each other, as well as an electrophoretic layer disposed between the array substrate and the cover plate,
wherein the array substrate comprises:
a base;
a pixel electrode and a thin film transistor that are disposed on the base, wherein the pixel electrode is connected to the thin film transistor, and the thin film transistor comprises an active layer and a source/drain layer lapped with the active layer; and
a shielding electrode disposed between the pixel electrode and the source/drain layer, wherein the shielding electrode is insulated from the pixel electrode and the source/drain layer; and an orthographic projection of the active layer on the base is within an orthographic projection of the shielding electrode on the base, and is within an orthographic projection of the pixel electrode on the base,
wherein the orthographic projection of the shielding electrode on the base and the orthographic projection of the pixel electrode on the base has an overlapped region, and the shielding electrode and the pixel electrode are configured to form a storage capacitor,
the array substrate further comprises: a first insulating layer disposed between the pixel electrode and the shielding electrode, and a second insulating layer disposed between the source/drain layer and the shielding electrode; and
the source/drain layer comprises a first electrode and a second electrode,
wherein the first insulating layer is provided with a first via hole, the second insulating layer is provided with a second via hole communicated with the first via hole and the pixel electrode is connected to the first electrode through the first via hole and the second via hole.

\* \* \* \* \*